(12) United States Patent
Cropley et al.

(10) Patent No.: US 11,458,905 B2
(45) Date of Patent: Oct. 4, 2022

(54) ADAPTOR FOR MOUNTING A CARGO CARRIER TO A VEHICLE

(71) Applicant: Rhino Rack Australia Pty Limited, Eastern Creek (AU)

(72) Inventors: Richard Cropley, Sydney (AU); William Davis, Sydney (AU); Nicholas Clarke, Sydney (AU)

(73) Assignee: Rhino Rack Australia Pty Limited, Eastern Creek (AU)

(*) Notice: Subject to any disclaimer, the term of this patent is extended or adjusted under 35 U.S.C. 154(b) by 0 days.

(21) Appl. No.: 17/287,508

(22) PCT Filed: Oct. 28, 2019

(86) PCT No.: PCT/AU2019/051181
§ 371 (c)(1),
(2) Date: Apr. 21, 2021

(87) PCT Pub. No.: WO2020/082138
PCT Pub. Date: Apr. 30, 2020

(65) Prior Publication Data
US 2021/0362659 A1    Nov. 25, 2021

(30) Foreign Application Priority Data

Oct. 26, 2018 (AU) .......................... AU2018904069

(51) Int. Cl.
*B60R 9/045*    (2006.01)
*B60R 9/058*    (2006.01)

(52) U.S. Cl.
CPC .............. *B60R 9/045* (2013.01); *B60R 9/058* (2013.01)

(58) Field of Classification Search
CPC ............ B60R 9/045; B60R 9/058; B60R 9/10
See application file for complete search history.

(56) References Cited

U.S. PATENT DOCUMENTS

| 2,357,203 | A | * | 8/1944 | Jimmes | B60R 9/058 224/329 |
| 2,387,779 | A | * | 10/1945 | Strauss | B60R 9/045 224/325 |
| 2,635,615 | A |   | 4/1953 | Rice | |
| 3,215,323 | A |   | 11/1965 | Bonitt | |
| 3,917,136 | A | * | 11/1975 | Carson | B60R 9/058 224/330 |
| 4,101,061 | A | * | 7/1978 | Sage | B60R 9/058 224/322 |
| 4,586,638 | A | * | 5/1986 | Prescott | B60R 9/058 224/322 |

(Continued)

FOREIGN PATENT DOCUMENTS

DE    3221126 A1    12/1983
EP    1712420 A1    10/2006

(Continued)

*Primary Examiner* — Brian D Nash
(74) *Attorney, Agent, or Firm* — Bakos & Kritzer

(57) ABSTRACT

The present invention relates to an adaptor for mounting a cargo carrier to a vehicle surface, comprising a mounting element configured to enable a cargo carrier to be mounted thereto, a foot configured to engage with the vehicle surface, and a leg extending between the mounting element and the foot, wherein a length of the leg is adjustable.

12 Claims, 5 Drawing Sheets

(56) References Cited

U.S. PATENT DOCUMENTS

| | | | | |
|---|---|---|---|---|
| 4,688,706 | A | * | 8/1987 | Thulin .................... B60R 9/058 224/322 |
| 4,995,538 | A | * | 2/1991 | Marengo ................ B60R 9/045 224/325 |
| 5,104,020 | A | * | 4/1992 | Arvidsson ............... B60R 9/058 224/322 |
| 5,588,573 | A | * | 12/1996 | Mann ...................... B60R 9/058 224/330 |
| 5,706,989 | A | | 1/1998 | Vincent |
| 5,785,474 | A | * | 7/1998 | Kinouchi ................ B60R 9/058 224/329 |
| 6,382,483 | B1 | * | 5/2002 | Kleb ....................... B60R 9/045 224/321 |
| 7,721,925 | B1 | * | 5/2010 | Graffy .................... B60R 9/058 224/322 |
| 8,839,997 | B2 | * | 9/2014 | Lundgren ............... B60R 9/058 224/329 |
| 9,827,915 | B1 | | 11/2017 | Chappell |
| 2010/0252595 | A1 | | 10/2010 | Heuchert et al. |
| 2012/0031942 | A1 | * | 2/2012 | Lundgren ............... B60R 9/058 224/558 |
| 2015/0090754 | A1 | | 4/2015 | Lisle |
| 2017/0028930 | A1 | * | 2/2017 | Connors ................. B60R 9/048 |
| 2020/0282918 | A1 | * | 9/2020 | Andersson ............... B60R 9/04 |

FOREIGN PATENT DOCUMENTS

| | | | |
|---|---|---|---|
| GB | 1091782 | A | 11/1967 |
| WO | 2018093417 | A1 | 5/2018 |

* cited by examiner

ADAPTOR FOR MOUNTING A CARGO CARRIER TO A VEHICLE

PRIORITY DETAILS

The present application is the U.S. National Phase under 35 U.S.C. § 371 of International Application PCT/AU2019/051181, filed Oct. 28, 2019, which claims priority from AU 2018904069, filed in Australia on 26 Oct. 2019, the entirety of which is incorporated herein by reference.

TECHNICAL FIELD

The present invention generally relates to a means of mounting a cargo carrier such as a roof rack to a vehicle, and more particularly the invention relates to an adjustable adaptor for mounting a cargo carrier to a contoured vehicle surface.

BACKGROUND

Vehicle cargo carriers are common auxiliary structures that are installed on vehicles in order to expand their cargo-carrying capacity. Cargo carriers include structures such as vehicle racks or trays, bicycle racks, luggage carriers, ladder racks, and other containers, rails or racks that may be mounted to a vehicle. However, vehicles vary in shape and size between models, and the same surface on any two vehicle models may be of a different shape and curvature—known as the 'characteristic contour profile' of the surface. In particular, contoured vehicle roofs or the top surfaces of utility vehicle tray side walls will often have different contours, profiles, gradients, slopes and angles. It is rare for two vehicle models—particularly for models from different brands—to have matching surface contours.

Because of this, and with reference to FIG. 1, a cargo carrier P-12 is generally not specifically designed to match the contour of a vehicle, due to the wide variation in vehicle surface contours. The size and complexity of most types of cargo carrier prevents production of a cargo carrier model that is suitable for a particular vehicle. Instead, a 'mounting adaptor' P-10 is used to account for the specific contours and to enable a cargo carrier to be securely mounted to the vehicle. The prior art mounting adaptors P-10 are custom-produced for each vehicle model and are machined to match the unique contour profile for a surface of that particular model, rather than machining or otherwise uniquely shaping the cargo carriers, as the mounting adaptors P-10 could serve as an adaptor for multiple types of cargo carrier. However, this still requires separate shaping tools, injection moulds and designs for each vehicle model, which consumes significant time and money.

Accordingly, there is a need for a mounting adaptor that may be utilised across a range of different contoured vehicle surfaces, and that will be able to adapt to the differing characteristic contour profiles of a range of vehicle models.

DISCLOSURE OF THE INVENTION

In a first aspect, the present invention relates to an adaptor for mounting a cargo carrier to a vehicle surface, comprising a mounting element configured to enable a cargo carrier to be mounted thereto, a foot configured to engage with the vehicle surface, and a leg extending between the mounting element and the foot, wherein a length of the leg is adjustable. In an embodiment, the foot is pivotably connected to the leg, such that the leg and foot are able to selectively pivot about at least one axis relative to one another. In a further embodiment, the leg comprises an upper leg and lower leg pivotably connected to one another, with the upper and lower legs being able to selectively pivot about at least one axis relative to one another.

In an embodiment, the leg length is a combination of the effective upper leg length and the effective lower leg length, wherein the pivotable connection between the upper leg and the lower leg is a sliding pivotable connection, and the sliding pivotable connection enables at least one of the effective upper leg length and the effective lower leg length to be adjusted, thereby adjusting the length of the leg.

In an embodiment, the sliding pivotable connection comprises a slot extending along a portion of the lower leg and a fastener extending from the upper leg and into engagement with the slot, and disengagement of the fastener enables it to slidingly move along the slot, thereby adjusting the effective lower leg length. In an alternate embodiment, the sliding pivotable connection comprises a slot extending along a portion of the upper leg and a fastener extending from the lower leg and into engagement with the slot, and disengagement of the fastener enables it to slidingly move along the slot, thereby adjusting the effective upper leg length.

In an embodiment, disengagement of the fastener further enables the upper leg and lower leg to selectively pivot about the at least one axis relative to one another.

In an embodiment, the mounting element comprises a rail, the foot comprises a plurality of feet, with a leg extending between each of the plurality of feet and the rail, and each of the plurality of feet and plurality of legs are arranged along a length of the rail.

DESCRIPTION OF FIGURES

Embodiments of the invention will now be described with reference to figures, wherein.

DETAILED DESCRIPTION OF PREFERRED EMBODIMENTS

As used herein, an embodiment of the adaptor of the present invention is considered to be 'aligned' when a cargo carrier mounted thereto is mounted substantially level (i.e. substantially horizontally) or otherwise at an angle suitable for the particular type of cargo carrier.

Figure 1:
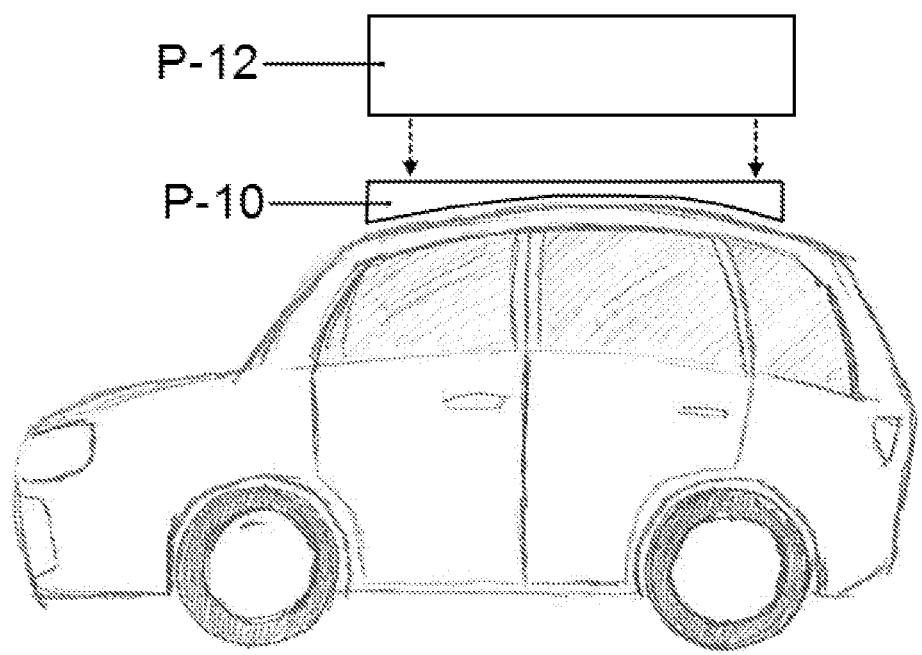
FIG. 1 depicts a prior art adaptor.
Figure 2:
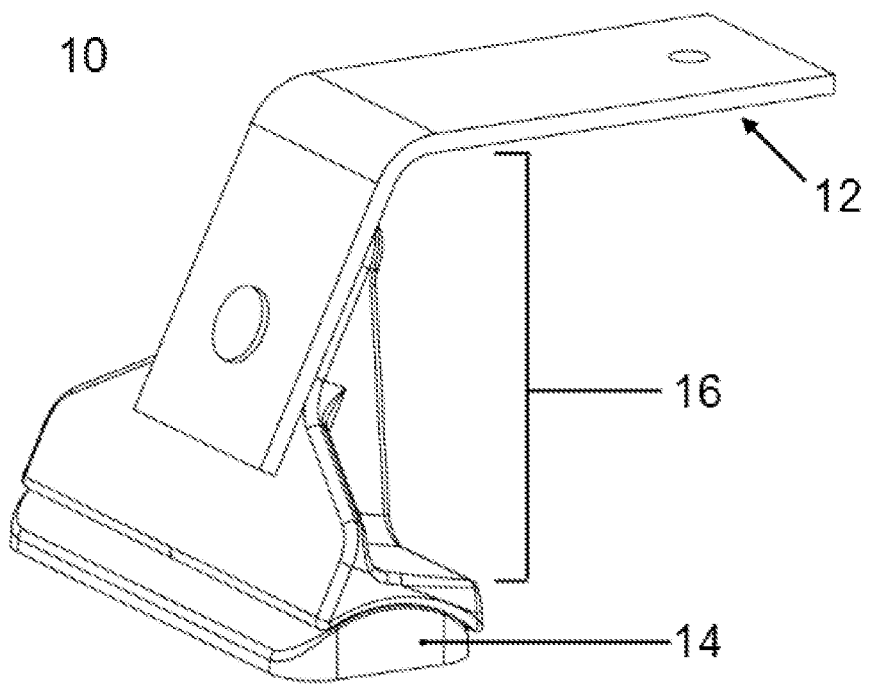
FIG. 2 depicts an embodiment of the adaptor of the present invention.

In a first aspect and with reference to FIG. 2, the present invention provides an adaptor for enabling the mounting of a cargo carrier to a contoured vehicle surface. In an embodiment, the adaptor 10 comprises a mounting element 12 that is configured to enable a cargo carrier to be mounted thereto, a foot 14 that is configured to engage with the vehicle surface, and a leg 16 extending between the mounting element 12 and the foot 14.

Adjustment of Leg Length

In an embodiment, a length of the leg 16 is adjustable, wherein the length of the leg is the distance between the mounting element 12 and the foot 14. This may enable a vertical height of the mounting element 12 above the vehicle surface to be adjusted. In some alternate embodiments, the vertical position of the leg relative to the mounting element 12 or the foot 14 may be adjustable. In some embodiments, the leg may be extendable/retractable. In some embodiments, the leg may fold or unfold. In some embodiments, the leg may move relative to the mounting element 12 or foot 14. Any one of these embodiments may enable the cargo carrier to be mounted to a vehicle surface that is sloped, contoured or otherwise having a changing height by using at least a spaced-apart pair of adaptors 10. By adjusting the vertical height of the mounting element 12 of one of a pair of spaced adaptors 10 above the vehicle surface, to align it with the mounting element 12 of the other of the pair of adaptors 10, changes in vehicle surface height may be accounted for, thereby enabling a cargo carrier to be substantially levelly mounted.

Figure 3:
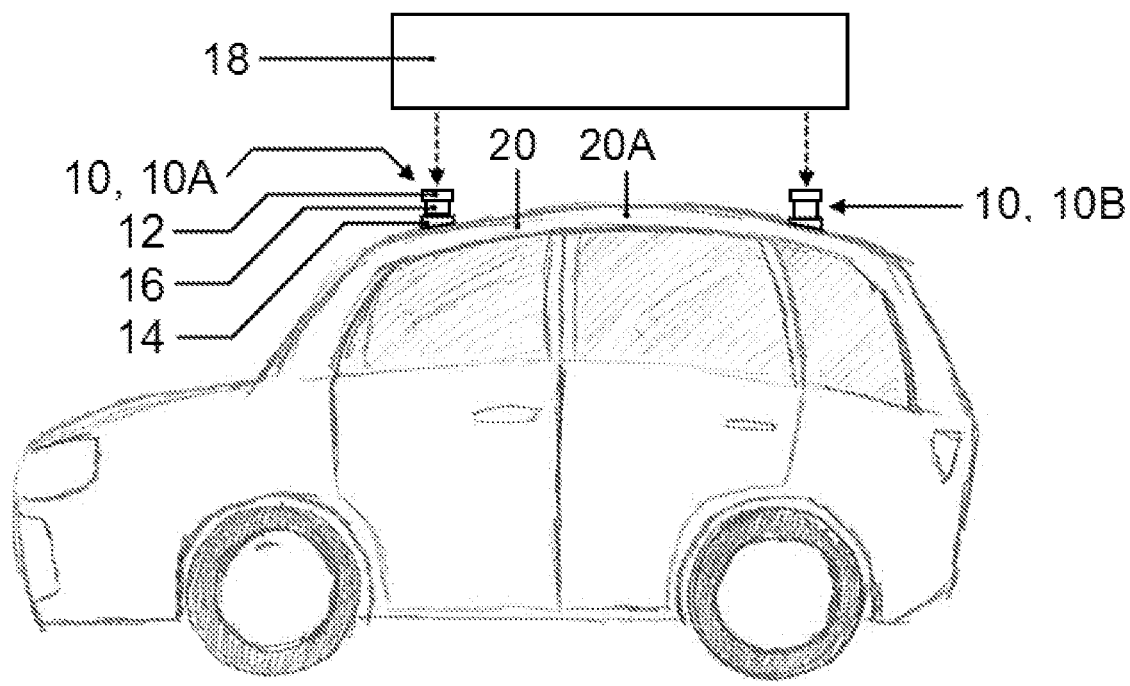
FIG. 3 depicts the adaptor of FIG. 2 in use on a vehicle.

By way of non-limiting example and with reference to FIG. 3, an embodiment of the adaptor 10 may enable a cargo carrier 18 to be mounted to a vehicle having a surface 20. Shown in FIG. 3 is a first adaptor 16A and a second adaptor 16B positioned on surface 20 to provide fore and aft mountings for the cargo carrier 18. Each adaptor 10 comprises a mounting element 12, leg 16 and foot 14. Adjustment of the length of the leg of each of the first and second adaptors 16A, 16B may enable the cargo carrier to be mounted while accounting for the changing slope of the vehicle surface 20, in particular the 'peak' 16A of the vehicle surface 20. In addition, as the skilled person will appreciate, the cargo carrier 18 must ideally be mounted substantially level upon the vehicle surface 20. Adjustment of the length of the leg 16 of each of the first adaptor 16A and second adaptor 16B may thus enable the cargo carrier to be positioned substantially level to the ground when mounted upon the mounting elements of the first and second adaptors 16A, 16B. Therefore, at least the present embodiment of the adaptor enables the substantially level mounting of a cargo carrier 18 to a vehicle surface 20 without requiring specific shaping or tooling of the adaptor to match a particular vehicle surface. The skilled person will appreciate that while the depicted example is in relation to longitudinal sloping and curvature of a vehicle surface, the same reasoning equally applies to accounting for and overcoming lateral sloping and/or curvature of a vehicle surface.

Figure 4:
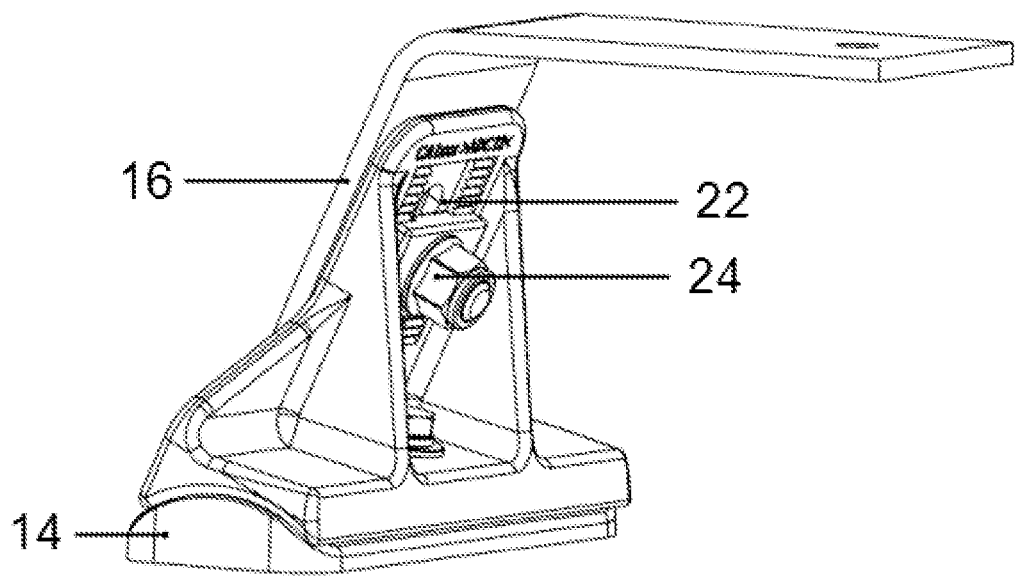
FIG. 4 depicts an embodiment of an extendable adaptor.

The length of the leg 16 may be adjusted through any of a number of potential means. In one exemplary embodiment and with reference to FIG. 4, the leg 16 may comprise two parts connected by sliding connection 22 having locking means 24. Disengagement of the locking means 24 enables one part of the leg 16 to be moved relative to the other, and engagement of the locking means 24 may lock the leg 16 at a particular length. In some embodiments, the locking means 24 may comprise a locking screw or locking bolt. In an alternative embodiment, the locking means 24 may comprise a clamp or pawl, manipulation of which may serve to engage or disengage the locking means and thereby prevent or enable adjustment of the height of the leg 16.

There are alternative means of enabling adjustment of the height of each leg 16. By way of non-limiting example, one means may comprise a rack-and-pin, wherein a movable portion of the leg 16 may be positioned at one of a series of heights defined by holes, recesses or rack teeth, and a pin, pawl or tab holds the mobile portion at a particular height.

In a further non-limiting example, the leg 16 may be threaded onto, or otherwise in threaded engagement with, a threaded bolt extending vertically either upward from the foot 14 or downward from the mounting element 12. Rotation of the bolt may therefore urge the leg 16 to move up or down, depending on the direction of rotation, in a process known in the industry as 'screw-jacking'. These and other means of adjusting the length of the leg 16 may be utilised without departing from the scope of the invention.

Angular Adjustment of the Foot and Leg

In some scenarios the point on the vehicle surface where the foot is to be attached may be at a particular angle relative to a horizontal plane. The angle of the attachment site may differ between vehicle models, makes and brands, and so it may be advantageous to provide a means of adjusting the angular alignment of the mounting element 12 relative to a substantially horizontal plane. The angle of the vehicle surface may also differ across a dimension of the vehicle surface, and therefore being able to configure the adaptor 10 to be attachable to a point on a surface regardless of the 'local' slope angle may be advantageous.

Figure 5A:
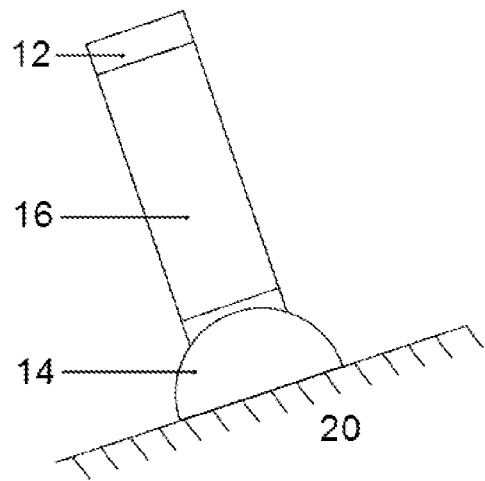
FIGS. 5A & 5B diagrammatically depict an embodiment of a pivotable adaptor.
Figure 5B:
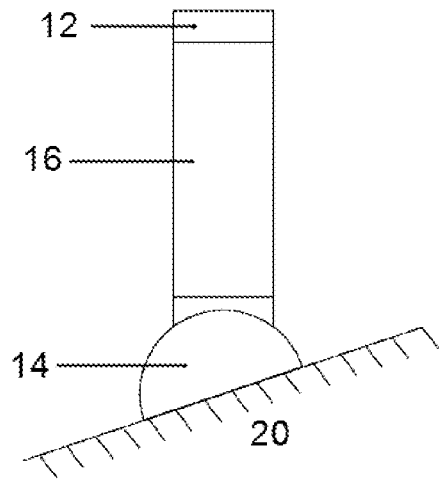

In an embodiment of the present invention and with reference to FIGS. 5A and 5B, the foot 14 may be pivotably connected to the leg 16, such that the foot 14 and leg 16 are able to pivot about an axis relative to one another. In FIG. 5A, the adaptor 10 is unaligned, as the mounting element 12 is not positioned substantially level. Pivoting of the leg 16 about the pivoting connection to the foot 14 enables adjustment of the angle between the mounting element 12, the foot 14 and the surface 20, as shown in FIG. 5B wherein the mounting element is substantially level, and therefore the adaptor 10 is substantially aligned. At least the present embodiment of the invention may therefore enable the adaptor 10 to be adapted to be aligned when attached to the vehicle surface 20 having a particular slope angle.

In one further embodiment, the axis of rotation may be a longitudinal axis, being aligned with the vehicle's direction of travel. In an alternative further embodiment, the axis of rotation about which the foot 14 rotates may be a lateral axis, being perpendicular to the vehicle's direction of travel. In at least each of the above further embodiments, pivoting of the foot 14 relative to the leg 16 may enable configuration of the mounting alignment of the foot 14. In at least one further embodiment, the pivotable connection may be selectively pivotable, wherein the foot 14 and leg 16 may be selectively locked at a particular relative angle.

Without wishing to be limited by theory, it is further envisaged that the adaptor 10 of at least one embodiment of the present invention may enable an angle at which the cargo carrier is mounted to be adjusted. In typical use, the cargo carrier will be mounted to a spaced pair of an embodiment of the adaptor of the present invention. Configuration of an embodiment of the adaptor may therefore enable the mounting elements 12 of the spaced pair of adaptors to be aligned such that, upon mounting, the cargo carrier is essentially horizontal with respect to a horizontal plane of the vehicle, or is otherwise mounted at the desired mounting angle.

Figure 6:
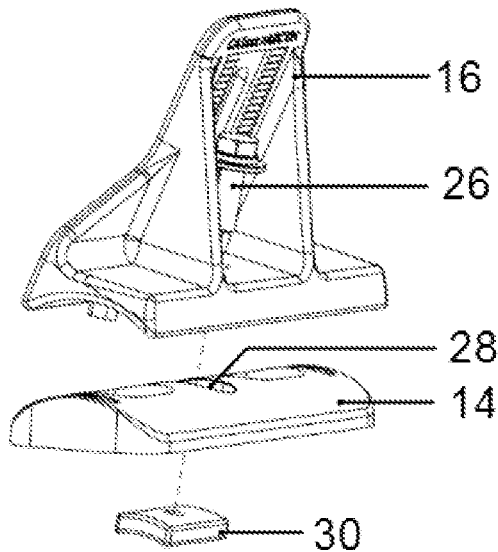
FIGS. 6 & 7 depict embodiments of pivotable adaptors.
Figure 7:
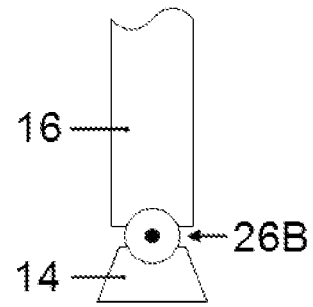

FIG. 6 depicts an exploded view of an embodiment of the adaptor 10 having a foot 14 pivotable relative to the leg 16 (the mounting element 12 is not shown). In at least the depicted embodiment, the adaptor 10 comprises a foot connector 26 that connects the leg 16 to the foot 14, the foot connector 26 extending through slot 28. The foot connector 26 is able to slide within slot 28 enabling the leg 16 to pivot relative to the foot 14. In a further embodiment, tightening engagement of foot connector 26 with a receiver 30 on the underside of the slot enables the foot 14 and leg 16 to be locked at a particular angle. In alternate embodiments, the means of enabling the foot 14 and leg 16 to pivot relative to one another may comprise other means of providing pivoting and/or rotation such as a ball-and-socket joint, a hinge, a rotating pin, one or more bearings, or a ratchet-and-pawl mechanism. FIG. 7 depicts an alternate example, wherein foot 14 and leg 16 are pivotably connected by hinged connector 26B. The skilled person will appreciate that alternate means of enabling rotation may be used without departing from the scope of the invention.

Without limiting the scope of the invention through theory, it is considered that providing a means of rotating the foot relative to the leg (or vice versa) may enable the foot to be aligned with the angle of the vehicle surface. In one further embodiment, the axis of rotation may be a longitudinal axis, being aligned with the vehicle's direction of travel. In an alternative further embodiment, the axis of rotation about which the foot 14 rotates may be a lateral axis, being perpendicular to the vehicle's direction of travel. In at least each of the above further embodiments, pivoting of the foot 14 relative to the leg 16 may enable configuration of the mounting alignment of the foot 14.

Angular Adjustment within the Leg

Figure 8A:
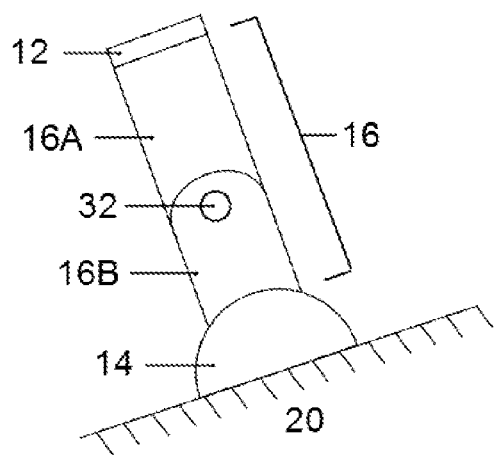
FIGS. 8A & 8B diagrammatically depict an alternate pivotable adaptor.
Figure 8B:
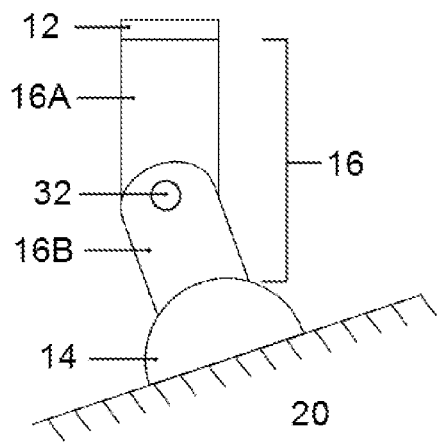
Figure 9:
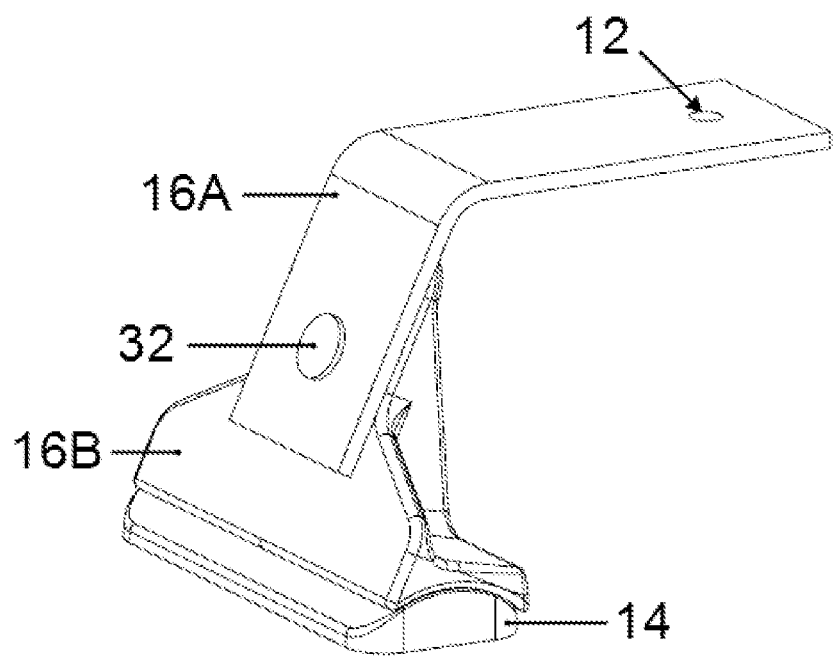
FIGS. 9, 10, and 11 depict embodiments of the alternate pivotable adaptor.

In an alternate embodiment of the present invention, the adaptor 10 may comprise a pivot point along the length of the leg 16. With reference to FIGS. 8A and 8B, an embodiment of the adaptor 10 may comprise a leg 16 that is an upper leg 16A and lower leg 16B having a pivoting connection 32 connecting the upper and lower legs 16A, 16B. The pivoting connection 32 enables upper leg 16A to rotate with respect to lower leg 16B (or vice versa) about at least one axis. This may enable the angle of the mounting element 12, relative to a vehicle surface to which the foot 14 is connected, to be adjusted, thereby enabling alignment of the adaptor 10. FIG. 9 depicts a further exemplary embodiment of the adaptor 10 having a lower leg 16B, upper leg 16A, and pivoting connection 32 therebetween.

In a further embodiment of the present invention, the pivoting connection 32 between the upper leg 16A and lower leg 16B may be a sliding pivoting connection. In such an embodiment, the length of the upper leg 16A between the mounting element 12 and connection 32 may be considered the effective upper leg length, and the length of the lower leg 16B between the foot 14 and connection 32 may be considered the effective lower leg length, such that the total length of the leg 16 is the combination of the two effective lengths. In one form, the connection 32 may slide along the lower leg 16B, thereby altering the effective lower leg length. In an alternate form, the connection 32 may slide along the upper leg 16A, thereby altering the effective upper leg length. In either form, the total length of the leg 16 may be adjusted, thereby enabling adjustment of the vertical height of the mounting element 12 above the surface 20.

Figure 10:
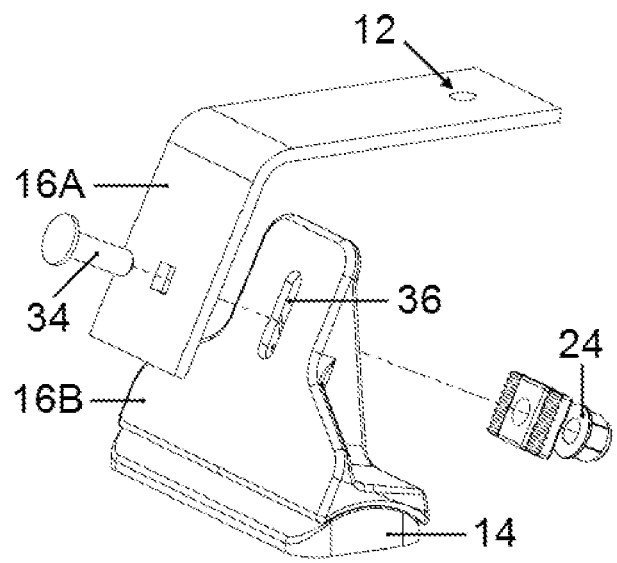
Figure 11:
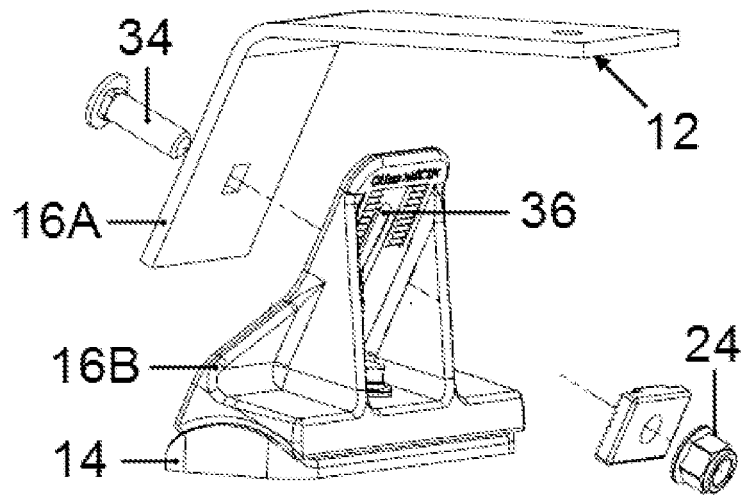

An exemplary embodiment of an adaptor having an upper leg 16A and lower leg 16B joined by a slidable pivoting connection 32 is depicted in FIGS. 10 and 11, being exploded views thereof. The connection comprises connecting fastener 34 that extends through upper leg 16A, into slot 36 and into engagement with fastening receiver 24. The connecting fastener 34 is able to traverse along slot 36, thereby adjusting the effective lower leg length. The skilled person will appreciate that an alternate embodiment wherein the slot 36 is on the upper leg 16A exists and is within the scope of the present invention.

Combined, Alternate and Further Embodiments

In some scenarios, a contoured vehicle surface 20 to which a cargo carrier 18 is to be mounted may be contoured in more than one dimension. In other words, the surface may curve laterally as well as longitudinally.

In an embodiment, the adaptor 10 may comprise a lower leg 16B and an upper leg 16A that are connected via pivoting connection 32, and the entire leg 16 may be connected to the foot 14 via pivotable foot connector 26. In such a combined embodiment, the lower and upper legs 16A, 16B, and the foot 14 with respect to the entire leg 16, may be pivotable about different axes. The axes may be substantially orthogonal to one another, such that the angle between the mounting element 12, the foot 14, and the vehicle surface 20 may be adjusted in two dimensions.

In an alternate embodiment, the foot 14 may be pivotable about both a longitudinal axis and a lateral axis. This embodiment may or may not comprise an upper leg 16A and lower leg 16B pivotably connected to one another, as the pivotable foot may enable angular adjustment along multiple axes. In a further alternate embodiment, the adaptor 10 may comprise an upper leg 16A and lower leg 16B that are pivotably connected to one another, with the upper and lower legs 16A, 16B able to pivot along multiple axes with respect to one another.

Figure 12:
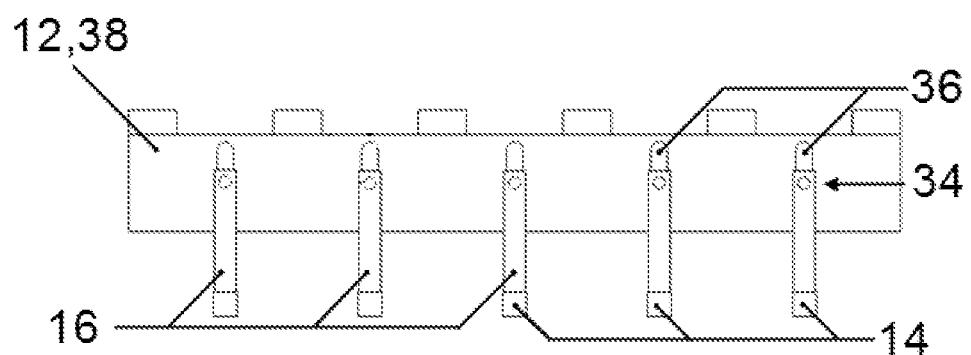
FIG. 12 depicts an embodiment of the adaptor comprising multiple legs.

It may be advantageous to provide a mounting element in the form of a mounting rail that enables a cargo carrier to be mounted thereto. In such an embodiment and with reference to FIG. 11, the adaptor may comprise mounting rail 38 and a plurality of feet 14, with a leg extending between each of the plurality of feet and a point along the length of the rail. The legs and the feet may incorporate one or more of the previously discussed embodiments thereof. In the embodiment depicted in FIG. 11, for example, legs 16 are slidably connected via fastener 34 into slots 36, such that they are able to move relative to mounting rail 38. This enables the 'leg length' to be altered, as the distance between foot 14 and mounting element 12 or mounting rail 38 to be altered. As depicted, each leg may be moved independently, enabling different 'leg lengths' to be set for each leg 16. The embodiment depicted in FIG. 12 comprises five legs 16 and five feet 14, but as the skilled person will appreciate there may be any number of feet and associated legs.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

The invention claimed is:

1. An adaptor for mounting a cargo carrier to a vehicle surface, comprising:
   a mounting element configured to attach to the cargo carrier, a foot configured to engage with the vehicle surface, a leg extending between the mounting element and the foot, a pivotable ankle connection between the foot and the leg, and a locking means;
   wherein the leg comprises an upper leg and lower leg pivotably connected to one another;
   the upper and lower legs being able to selectively pivot about at least one axis relative to one another;
   wherein a vertical length of the leg is adjustable, such that a height of the mounting element above the foot is adjustable;
   the pivotable ankle connection enables the foot to selectively pivot relative to the leg about at least one of a lateral and longitudinal axis; and
   the locking means enables the foot to be selectively locked at a particular angle, about the axis, relative to the leg.

2. The adaptor of claim 1, wherein:
   a length of the upper leg, from the pivotable connection to the mounting element, is an effective upper leg length;
   a length of the lower leg, from the pivotable connection to the foot, is an effective lower leg length; and
   the leg length being a combination of the effective upper leg length and the effective lower leg length;
   further wherein the pivotable connection between the upper leg and the lower leg is a sliding pivotable connection; and
   the sliding pivotable connection enables at least one of the effective upper leg length and the effective lower leg length to be adjusted, thereby adjusting the vertical length of the leg.

3. The adaptor of claim 2, wherein the sliding pivotable connection comprises a slot extending along a portion of either the lower leg or the upper leg, and a fastener extending from the other of the lower leg or the upper leg and into engagement with the slot; and
   disengagement of the fastener enables it to slidingly move along the slot, thereby adjusting the effective length of the leg that comprises the slot.

4. The adaptor of claim 3, wherein disengagement of the fastener further enables the upper leg and lower leg to selectively pivot about the at least one axis relative to one another.

5. The adaptor of claim 1, wherein:
   the mounting element comprises a rail configured to receive and be affixed to the cargo carrier;
   the adaptor further comprises a plurality of feet arranged along a length of the rail, with a leg extending between each of the plurality of feet and the rail; and
   each of the plurality of feet are able to selectively pivot relative to their respective leg, about at least one axis, independent of one another; and
   a vertical length of each leg is able to be adjusted independent of the other legs.

6. The adaptor of claim 1, wherein the pivotable ankle connection comprises a slot in an upper surface of the foot; and
   the locking means comprises a foot connector extending from a lower end of the leg, through the slot, and into engagement with a receiver, the foot connector being able to slide along the slot;
   further wherein sliding the foot connector along the slot enables the foot to pivot about the at least one axis relative to the leg; and
   tightening engagement between the receiver and the foot connector locks the foot at a particular pivot angle.

7. An adaptor for mounting a cargo carrier to a vehicle surface, comprising:
   a mounting element configured to attach to the cargo carrier, a foot configured to engage with the vehicle surface, a leg extending between the mounting element and the foot, a pivotable ankle connection between the foot and the leg, and a locking means;
   wherein a vertical length of the leg is adjustable, such that a height of the mounting element above the foot is adjustable;
   the leg comprises an upper leg and a lower leg pivotably connected to one another with a pivotable connection, such that the upper and lower legs are able to selectively pivot relative to one another about a first axis;
   the upper leg extends between the mounting element and the pivotable connection, and the lower leg extends between the pivotable connection and the foot;
   the pivotable ankle connection enables the foot to selectively pivot relative to the leg about a second axis, the second axis being at least one of a lateral and longitudinal axis and substantially orthogonal to the first axis; and
   the locking means enables the foot to be selectively locked at a particular angle, about the axis, relative to the leg.

8. The adaptor of claim 7, wherein:
   a length of the upper leg, from the pivotable connection to the mounting element, is an effective upper leg length;
   a length of the lower leg, from the pivotable connection to the foot, is an effective lower leg length; and
   the leg length being a combination of the effective upper leg length and the effective lower leg length;
   further wherein the pivotable connection between the upper leg and the lower leg is a sliding pivotable connection; and
   the sliding pivotable connection enables at least one of the effective upper leg length and the effective lower leg length to be adjusted, thereby adjusting the vertical length of the leg.

9. The adaptor of claim 8, wherein the sliding pivotable connection comprises a slot extending along a portion of either the lower leg or the upper leg, and a fastener extending from the other of the lower leg or the upper leg and into engagement with the slot; and
   disengagement of the fastener enables it to slidingly move along the slot, thereby adjusting the effective length of the leg that comprises the slot.

10. The adaptor of claim 9, wherein disengagement of the fastener further enables the upper leg and lower leg to selectively pivot about the at least one axis relative to one another.

11. The adaptor of claim 7, wherein:
    the mounting element comprises a rail configured to receive and be affixed to the cargo carrier;
    the adaptor further comprises a plurality of feet arranged along a length of the rail, with a leg extending between each of the plurality of feet and the rail; and each of the plurality of feet are able to selectively pivot relative to their respective leg, about at least one axis, independent of one another; and a vertical length of each leg is able to be adjusted independent of the other legs.

12. The adaptor of claim 7, wherein the pivotable ankle connection comprises a slot in an upper surface of the foot; and the locking means comprises a foot connector extending from a lower end of the leg, through the slot, and into engagement with a receiver, the foot connector being able to slide along the slot;

further wherein sliding the foot connector along the slot enables the foot to pivot about the at least one axis relative to the leg; and tightening engagement between the receiver and the foot connector locks the foot at a particular pivot angle.

\* \* \* \* \*